United States Patent [19]

Gaquère

[11] Patent Number: 4,459,728

[45] Date of Patent: Jul. 17, 1984

[54] SCREW CLAMP PIN EXTRACTOR

[75] Inventor: Jean-Pierre Gaquère, Acheux en Amienois, France

[73] Assignee: Societe Nationale Industrielle et Aerospatiale, Paris, France

[21] Appl. No.: 405,799

[22] Filed: Aug. 6, 1982

[30] Foreign Application Priority Data

Aug. 13, 1981 [FR] France ................................ 81 15683

[51] Int. Cl.[3] ................................................ B23P 19/04

[52] U.S. Cl. ........................................ 29/240; 29/252; 81/470; 72/391

[58] Field of Search .......................... 29/238, 240, 252; 81/470, 469; 72/114, 391

[56] References Cited

U.S. PATENT DOCUMENTS 2,789,619 4/1957 Wing et al. ........................... 29/252
3,162,072 12/1964 Stewart .
3,331,268 7/1967 Jones ................................... 81/13 X
3,654,792 4/1972 Mead ................................ 72/391 X
3,786,550 1/1974 Jones .

FOREIGN PATENT DOCUMENTS 941581 7/1948 France .
1491450 7/1967 France .

*Primary Examiner*—Frederick R. Schmidt
*Assistant Examiner*—Steven P. Schad
*Attorney, Agent, or Firm*—Karl W. Flocks; Sheridan Neimark

[57] ABSTRACT

Screw clamp pin extractor for clamping pins of the type having a body fastened to a spreader lying between two tongs secured to a screw, and a nut acting against a spring. The extractor comprises a pneumatic motor, a nose portion engaging the clamp pin and carrying a sleeve brought into contact with an assembly of sheets, said extractor comprising moreover an internal mechanical system. When the motor rotates for unscrewing pins the device is locked on the pin and the nut of same can be unscrewed, and thereafter, the pin is extracted through the action of a jack. The extractor can be attached as desired either to the body of the usual manual screwing machine or a robotic head known in itself.

5 Claims, 9 Drawing Figures

SCREW CLAMP PIN EXTRACTOR

This invention relates to screw clamping pins which are utilized more particularly in the aeronautic field as follows:

(1) positioning of the clamp pin into the drill hole, and then screwing on of the nut of the pin thereby permitting the sheets forming an assembly to come alongside, (2) unscrewing of the nut, followed by extraction of the pin from its lodging.

Both of these sequences are carried out successively to permit polymerization of the interposition product put between the sheets, or correct positioning of the assembly when there is no such interposition product therein.

However, these two sequences of implementation raise a certain number of practical problems:

the mounting pitch of clamp pins is sometimes reduced, and therefore requires little cumbersome screwing and unscrewing nose portions, the interposition product between the sheets which is of a rubbery consistency flows out into the holes thereby causing great difficulties to extract clamp pins after polymerization.

However, although the pneumatic screwing and unscrewing devices now proposed comprise nose portions of reduced size, suitable for most cases encountered, the problem of extraction of clamp pins still remains, and to the applicant's knowledge, has not yet met with a satisfactory solution. As a matter of fact, this operation is always effected manually, sometimes in areas of great density of clamp pins, thereby implying in addition to the hazards of manual disassembling risks of injuries to workers.

Moreover, such manual method of working does not lead to developments for robotic operation when all the steps will be effected without human intervention.

All attempts made in this domain, known to the applicant have brought solutions that significantly increase the bulk of the nose portions thereby limiting the practical use thereof to the only zones of low density of insertion of clamp pins.

This invention proposes an automatic unscrewing and extraction device for screw clamp pins, which has none of the drawbacks mentioned hereinabove.

The first advantage of the device of this invention resides in the fact that it can be utilized in a simple manner as the nose portion of a manual pneumatic unscrewing device employed in most cases in the aeronautic field.

A second advantage consists in that such nose portion can also be accommodated on the arms of robots which may also be the same as those which bore holes for the pins and fit rivets for final securement.

A third advantage consists in that such nose portion has a reduced size thereby permitting access to clamp pins mounted in areas with high density thereof.

The concept of fitting the clamp pins with a six-sided system on the clamping nut seems to date back from 1962 as disclosed in U.S. Pat. No. 3,024,682.

This was then presenting the advantage of permitting insertion of clamp pins by pneumatic guns, which were already very common at that time in the aeronautic field.

Furthermore, it was disclosed in said patent that the body of the clamp pin could also be held and fixed by a six-sided form-piece of the body, so that the nose portion of the screwing device could comprise two coaxially rotating tubes each terminated by a hexagonal die, i.e. the inner tube for the nut and the outer tube for the body of said clamp pin.

Pulling out the clamp pin was not desirable and it was always possible to grip the clamp pin in a simple manner by bringing into coincidence both hexagonal portions of the nut and the body of the clamp pin.

The problem of manual extraction of clamp pins was solved in the U.S. Pat. No. 3,331,268 of 1967 in which it was shown how it was possible by means of a third outer tube with a hexagonal end to grip the body of the pin after an angular rotation of 1/12 of a turn by applying said third tube below the points of the sides of the hexagonal portion of the clamp pin.

Extraction of the clamp pins was then possible but was depending both on the skilfulness of the worker and the extent of imprisonment of the pin in its hole, due to the quantity of polymerized interposition product that might have flown in.

Additionally, it must be noted that the pneumatic screwing machines were to benefit from a significant improvement consisting of bringing the motor to stall in the screwing or unscrewing as soon as a predetermined torque appeared, thereby affording the advantage of greatly reducing air consumption without damaging the equipment.

It will generally be shown hereinbelow how the invention can be used to improve the prior methods so as to provide a well-advanced device to unscrew and extract the screw clamp pins in a completely automated manner.

Anyhow, the invention will be better understood in the following description which will show in the light of the attached drawings how the invention can be put into practice both as regards application thereof to manual screwing devices and robotic arms.

Figure 1:
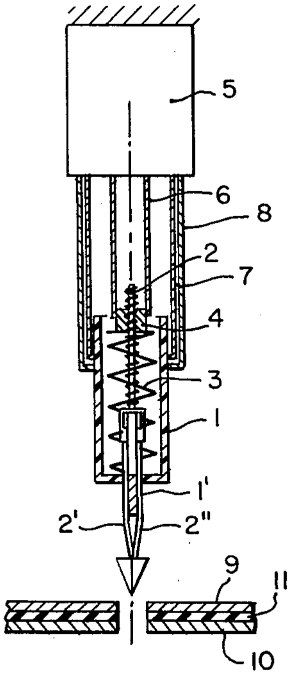
FIG. 1 is a schematic axial cross-sectional view of a screw clamping pin opposite its insertion hole.

With reference to FIG. 1, a screw clamp pin substantially comprises a hollow body 1 which may be made of plastics material, and which is made integrally with a spreader 1' between tongs 2' and 2'' fastened to a screw 2 on the one hand, and on the other hand, a spring 3 and a nut 4 engaging the screw 2 and acting against said spring 3.

The usual pneumatic system in its turn comprises a body 5 for receiving the motor thereon (not shown) which drives into rotation an outer tube 6 having a six-sided end as well as two other tubes one of which denoted 7 is external and terminated at its end by a six-sided portion and is fixedly secured to the body 5 while the other tube denoted 8 is in an intermediary position, and also terminated at its end by a die also hexagonal in shape.

Upon engagement of the hexagonal portion of body 1 of the clamp pin into the corresponding die of tube 7, the clamp pin is positioned and will be locked in when the tube 8 has rotated by 1/12 of a turn such that the flat faces of the six-sided die of tube 8 lie below the points of the six-sided portion of the hexagonal section of the clamp pin.

The so gripped and locked clamp pin is inserted into the holes of the assembly consisting of sheets 9 and 10, and the interposition product 11.

Figure 2:
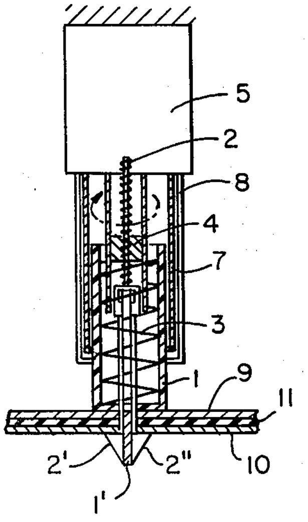
FIG. 2 is a schematic and axial cross-sectional view of the same clamp pin in its hole before polymerization of the interposition product.

According to the second operational step shown on FIG. 2, the nut 4 is screwed on up to a predetermined torque such that the tongs 2' and 2'' are brought to hook on by spreading the opposite face of the assembly thereby urging sheets 9 and 10 to come together through the bias of spring 3. The nose portion may then be removed after rotation by 1/12 of a turn of tube 8 with respect to tube 7.

Figure 3:
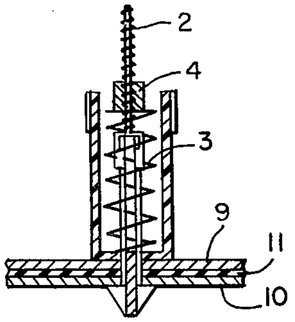
FIG. 3 is a view of the clamp pin in its position following polymerization.

In the third operational step shown on FIG. 3, the clamp pin is left in place throughout the polymerization period of product 11 while spring 3 by restitution of its energy urges the sheets 9 and 10 to come closer to one another in the area of the hole during such period.

According to the fourth operational step prefiguring more particularly the implementation of the invention, the nose portion is put back into place on the clamp pin so that after suitable unscrewing of the nut 4, complete extraction of the clamp pin can be realized.

Figure 4:
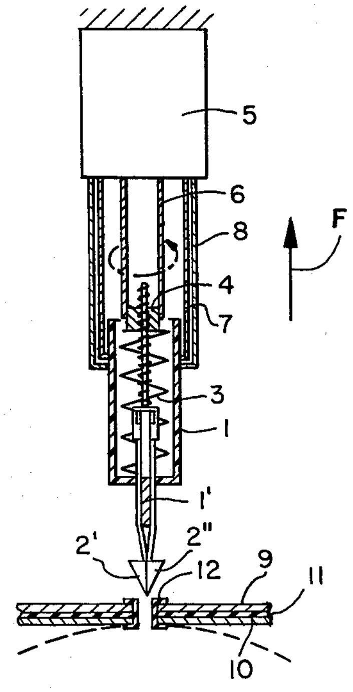
FIG. 4 is a schematic view showing how the clamp pin is pulled out of its hole.

It is to be noted that FIG. 4 fairly well represents the problems encountered prior to the application of the invention, in as far as the excess of product 12 was flowing into the hole itself due to compression of the sheets thereby making it very difficult to pull out the clamp pin from its hole.

As a matter of fact, it was necessary to exert significant pulling action in the direction F of FIG. 4 upon the nose portion to enable extraction of the clamp pin, such pulling action correlatively causing embossing of the assembly such as shown in dotted lines on FIG. 4.

The unscrewing and extracting nose portion according to the invention comprises as will be shown hereinafter, a portion resting upon the assembly while a jack is used for removing the clamp pin out of the hole thereof soon after the nut unscrewing phase.

Figure 5:
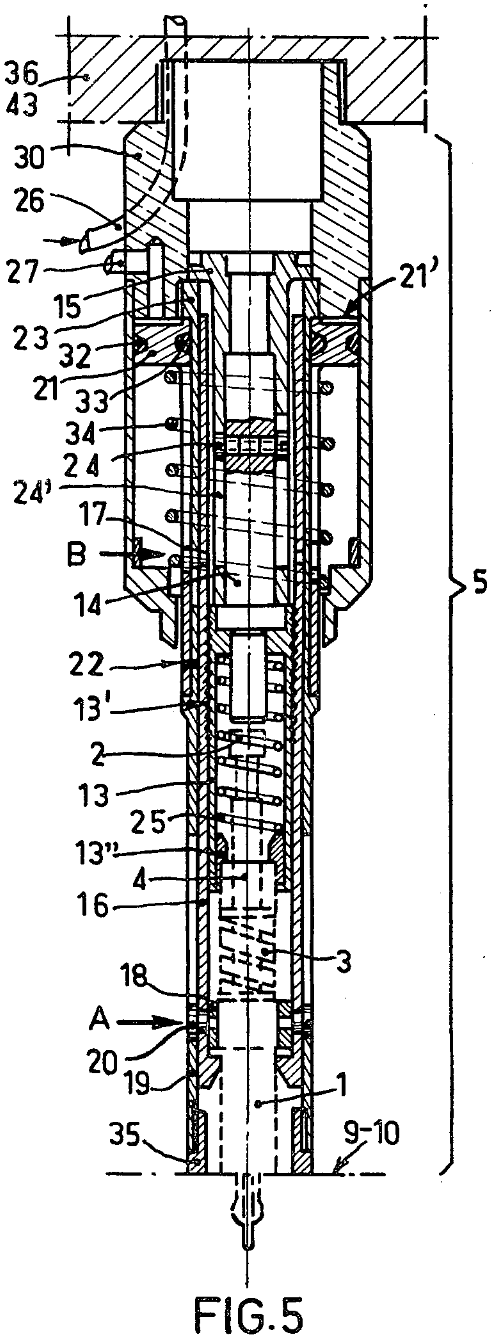
FIG. 5 is an axial cross-section of an unscrewing and extraction nose portion according to the invention.

Such nose portion substantially comprises as appears from FIG. 5, a drive portion, a sleeve portion and a piston portion.

According to the invention, the drive portion is known in itself and may result either from an adaptive configuration as a manual gun or from a more developed configuration as an automated station for robotic applications.

In both cases, and according to FIG. 5, the air motor initially drives into rotation the sleeve 13 through the shaft 14 and the driving part denoted 15.

Figure 6:
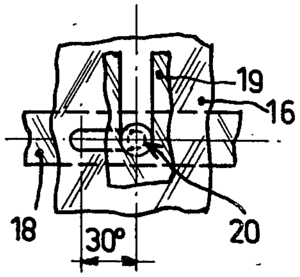
FIG. 6 is a view on a larger scale of a section according to the arrow A of FIG. 5.

The sleeve 13 is screwed on with an internal left-handed thread 13' into another sleeve 16 which can rotate by an angle of 30° so as to be locked or unlocked by the frictional force in the screw thread and because of the aperture formed in the part 16 such as shown in detail in FIG. 6.

Figure 7:
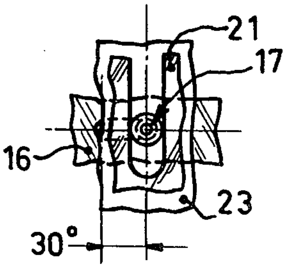
FIG. 7 is a view showing on a larger scale a section according to arrow B of FIG. 5.

The sleeve 16 is moreover fixed in translational motion as appears from FIG. 7 through the shaft screw 17 which only permits rotation thereof by 30°.

The locking is effected through rotation of sleeve 16 in front of the lock 18 which is itself fixed in rotation with respect to the outer body 19 by means of the screw 20 which also secures it in translation with respect to sleeve 16.

The body 19 is also fixed in rotation on piston 21 through the shaft of the stopping ring 22.

The piston 21 is fixed in rotation with respect to the inner guide of jack 23 by means of shaft screw 17.

In the unscrewing phase, the sleeve 13 moves axially forward in sleeve 16 due to the provision of the left-handed thread 13' until the screw 24 is brought to stop at the end of the axial aperture 24' formed in part 15 thereby bringing the motor to stall.

The sleeve 13 by its axial motion drives the shaft 14 which then presses against the screw of the clamp pin denoted 2.

It is to be noted that since sleeve 13 comprises a ring 13'' with an internal hexagonal die and has in sleeve 16 an outer thread which is of a lower pitch than that of the nut 4 of the clamp pin, it moves forward faster than does said nut 4 move backward, whereby spring 25 is then compressed by the effect of said sleeve 13' which in the unlocking step ejects the clamp pin from the nose portion of the screwing device.

Figures 8, 9:
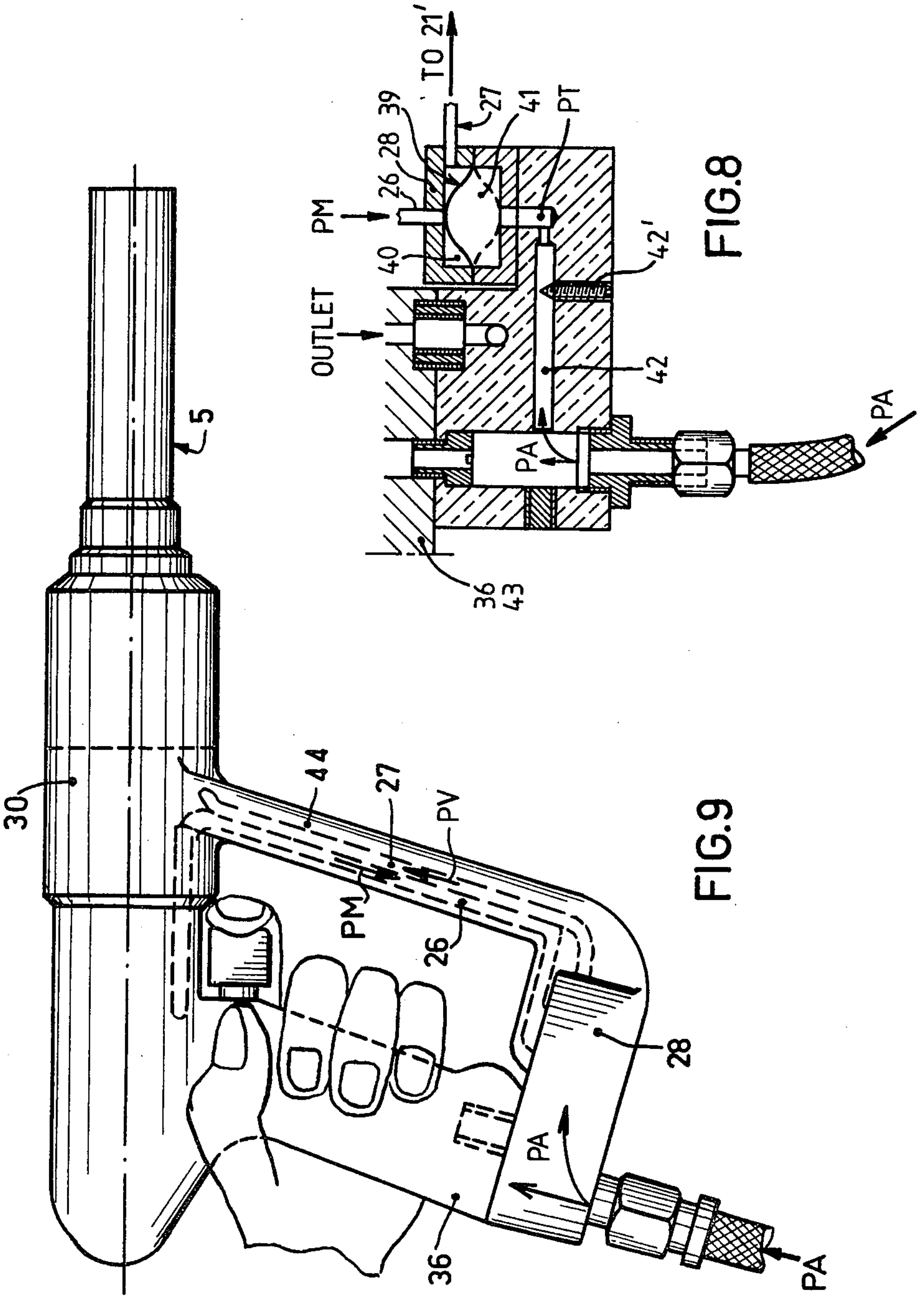
FIG. 8 is a schematic view in cross-section of the differential pressure system.
FIG. 9 is a plan view of a manual clamp pin unscrew and pull out machine according to the invention.

The drive part comprises two conduits, with one 26 feeding the motor pressure PM to the differential denoted 28 on FIG. 8, and the other denoted 27 feeding pressure from said differential 28 to the jack through the chamber 21'.

The stall of the motor resulting from the forward motion of the screw 24 coming into abutment at the bottom of the aperture 24' according to FIG. 5, produces pressure differential at the differential 28 through the conduit 26.

Since the pressure has increased on the motor side PM, and the reference pressure PT is fixed, the differential 28 permits the air to flow through the conduit 27 towards chamber 21' of the jack having sealing O-rings 32 and 33.

The piston 21 being thus acted upon pushes on the outer body 19 which consequently moves the clamp pin away from the surface of the assembly consisting of sheets 9 and 10.

This effect is produced because the sleeve 16 which carries an inner six-sided portion at its end may rotate by 30° (or 1/12 of a turn) in front of the other six-sided ring or lock 18 due to the presence of shaft screw 20, as shown in detail on FIG. 6.

The rotation of 1/12 of a turn is made possible by the friction of the threads of the threaded portion 13' between sleeves 13 and 16 as was already mentioned hereinabove.

In this way, extraction of clamp pins becomes possible because:

the body 19 pushes on the assembly 9–10 (through a ring 35 which can be made of plastics material);

the clamp pin is held in place by the lock 18;

the extraction application is ensured by the six-sided portion of sleeve 16 hooking on the angles of the six-sided portion of clamp pin 1 after rotation of 1/12 of a turn of sleeve 16 with respect to the shaft screw 20;

the pulling axial motion is provided by axial displacement of sleeve 16 with respect to ring 35 (or the body 19 connected thereto).

When the clamp pin is pulled out of the hole it is sufficient for the motor to turn in the direction of screwing thereby causing the sleeve 16 to become unlocked due to the friction in threads 13' and, moreover, causes removal of the pin. During this time, the jack is no longer fed with fluid so that the spring 34 urges it to its initial position.

At the end of the operation the sleeve 13 moves backward until the shaft 14 comes into abutment on the drive portion 15 thereby causing the motor to stall, so that the pull out device is in its backward position ready to extract the next clamp pin.

The differential 28 according to FIG. 8 comprises a supple diaphragm 39 delimiting two chambers as follows:

one chamber 40 which receives motor pressure PM from the motor return conduit through conduit 26, and returns it to the jack through conduit 27, and another chamber 41 receiving reference pressure PT flowing in through conduit 42 and which may possibly be adjusted by the set screw 42'.

The differential 28 can be secured as desired either to the lower portion of the grip 36 of an air gun of the usual type (as shown more particularly in FIG. 9) or to robotic head known in itself 43 (not represented in detail in this patent specification).

According to the first solution shown in FIG. 9, the operator takes in the usual manner the grip 36 comprising at the end thereof the pressure differential 28, the latter being connected to the air ports through conduits 26 (PM) and 27 (PV) extending through the bridge part 44 which is used moreover for physically protecting the operator's hand.

The pressure differential has a multiple function:

when the motor rotates for unscrewing:

the reference pressure PT is adjusted in chamber 41 through the set screw 42';

the motor pressure PM is lower than PT in chamber 40;

when the motor rotates for screwing on:

the motor pressure PM is nil in chamber 40;

air is not supplied to the jack and the diaphragm 39 is in the position shown by a reinforced line in FIG. 8.

when the motor is stalled in the unscrewing:

the reference pressure PT remains constant in chamber 41;

the motor pressure PM is higher than PT in chamber 40;

the diaphragm 39 follows the pattern shown in dotted lines in FIG. 8, and the jack is supplied with air through conduit 27;

when the motor is stalled during the screwing on;

The reference pressure PT remains constant in chamber 41;

the motor pressure PM is nil in chamber 40;

the jack is not supplied with air and the diaphragm 39 follows the pattern shown in full lines in FIG. 8.

Therefore, it can be seen that the automatic sequences for effecting the unscrewing and extraction operations of the clamp pin or the clamp pin removal proper are totally provided by the device described hereinabove in accordance with the invention.

It is also to be noted that the nose portions 5 can be fixed by a sleeve 30 either to a body 36 of the usual manual screwing device as is shown in FIGS. 5 and 9, or to a robotic head known in itself denoted by reference 43.

In the latter case, the robot employed for the clamp pin removal operation could obviously be the same as that which:

drills the holes, positions and screws on the clamp pins, pulls out the pins (according to the invention), applies the final rivets (or bolts) thereto, only the robotic heads being changed depending on the intended operative steps.

It will be understood that this invention was only described and represented in a preferential exemplifying way and that technically equivalent changes may be made in its constituents without departing from its scope as defined in the appended claims.

I claim:

1. An extractor for screw clamping pins of the type comprising a body fastened to a spreader lying between two tongs secured to a screw and a nut acting against a spring, wherein the extractor comprises:

- a pneumatic motor which stops without air interruption during screwing and unscrewing;
- a nose portion positioned on the motor and comprising:
  - a six-sided sleeve comprising a slidable ring with a hexagonal die,
  - a locking sleeve having two pairs of radial apertures formed therein to permit rotation of 30° with respect to a lock and terminated by a six-sided portion and which after rotation thereof provides for application under the points of the six-sided portion of the clamp pin,
  - said lock being fixed both in rotation with respect to an outer body and in translation with respect to the locking sleeve through shaft screws,
  - a protective ring engaged with an assembly of sheets,
  - said outer body axially slidable on the sleeve under the effect of a piston,
  - said piston being connected to the outer body through a stopping ring;
  - a connecting sleeve to fasten the nose portion to the motor,
  - a jack consisting of said piston with its chamber and fastened to the connecting sleeve,
  - an inner guide for guiding in a translational motion the connecting sleeve and in a translational motion, the locking sleeve by means of the shaft screws,
  - a spring for returning the jack,
  - a drive motion means connected to the motor to impart rotation to a driving shaft,
  - said shaft slidable axially in the driving means to permit control of said six-sided sleeve,
  - two stop screws for bringing the motor to stall;
- a differential pneumatic device comprising:
  - a differential proper, which carries a diaphragm defining a first chamber into which a conduit for motor pressure leads, with a conduit controlling the jack and a second chamber into which a conduit for the reference pressure of the motor leads, said conduit being possibly adjusted through a set screw,
  - connecting means between the differential and the body to permit supply of the reference pressure, the arrangement of said motors, nose portion and differential being such that:

the nose portion can be engaged on the clamp pin until the protective ring is brought into contact with the surface of the sheets assembly;

when the motor rotates for unscrewing, it can, in a first period, drive the driving means which in its turn drives the driving shaft and the six sided sleeve, the latter then rotating in locking sleeve so as to drive it into rotation over 30° due to frictions in the threaded portion, thereby resulting in the locking thereof on the clamp pin, and in a second period, it permits forward motion of said six sided sleeve by pushing on the shank of the clamp pin in unscrewing the nut, and at the end of the stroke, the putting into abutment of the stop screws at the bottom of a aperture in the driving means thereby causing the motor to stall and correlatively, the operation of the differential pneumatic device which at its turn, feeds the jack through the chamber, thereby causing extraction of the pin;

when the motor rotates for screwing on, the jack is no longer fed and returns to its initial position, under the action of said spring while frictions in the threaded portions then provoke:

in a third period, the unlocking of the clamp pin, in a fourth period, the return of all of the constitutive elements to their initial positions.

2. An extractor according to claim 1, wherein the conduits are intended for providing:

inflow of the motor control pressure (PM) taken at the inlet to the pneumatic motor rotating for unscrewing, inlet of air to the jack taken at the differential pneumatic device, inlet of the reference pressure (PT) into the second chamber of the differential pneumatic device, The function of said inlets being such that:

when the motor rotates to unscrew:

the reference pressure (PT) is kept constant in the second chamber, the motor pressure (PM) is lower than reference pressure (PT) in the motor pressure chamber, hence interruption of supply to the jack;

when the motor is brought to stall during unscrewing:

the reference pressure (PT) is constant in the second chamber, the motor pressure (PM) is higher than reference pressure (PT) in the motor pressure chamber whereby the jack is fed;

when the motor rotates to screw on:

the reference pressure (PT) is constant in the second chamber, the motor pressure (PM) is nil in the motor pressure chamber, the pressure intake lying on the motor supply in the unscrewing, thereby cutting off supply to the jack, when the motor is brought to stall in the screwing on:

the reference pressure PT is constant in the second chamber, the pressure of the motor (PM) is nil, hence cutting off supply to the jack.

3. An extractor according to claim 2, wherein the motor, the nose portion and the differential pneumatic device consititute a portable machine with gun handle and trigger, while the conduit of motor pressure and the conduit of jack feed are disposed in a bridge part which also affords mechanical protection for the operator's hand.

4. An extractor according to claim 2, wherein the motor, the nose portion, the differential pneumatic device and the conduits constitute an assembly carried by a robotic arm.

5. An extractor according to claim 1, wherein the jack is configured as a ring about the rotary part of the nose portion.

* * * * *